Nov. 27, 1951   J. C. CLINEFELTER   2,576,444
ART OF TREATING PLASTIC MATERIALS SUCH AS RUBBER
Filed March 29, 1949   3 Sheets-Sheet 1

INVENTOR.
JAMES C. CLINEFELTER.
BY
ATTORNEYS.

Nov. 27, 1951  J. C. CLINEFELTER  2,576,444
ART OF TREATING PLASTIC MATERIALS SUCH AS RUBBER
Filed March 29, 1949  3 Sheets-Sheet 2
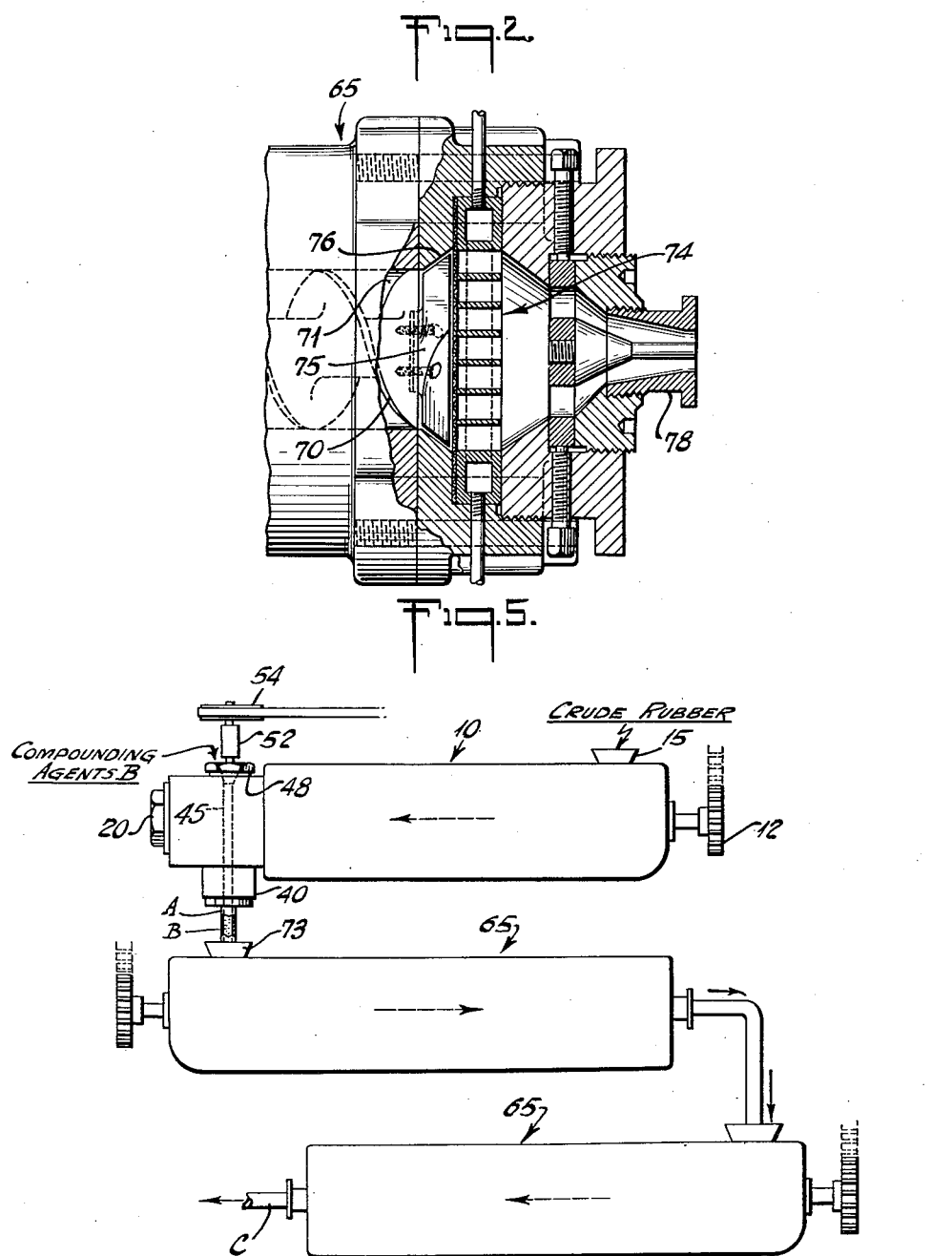

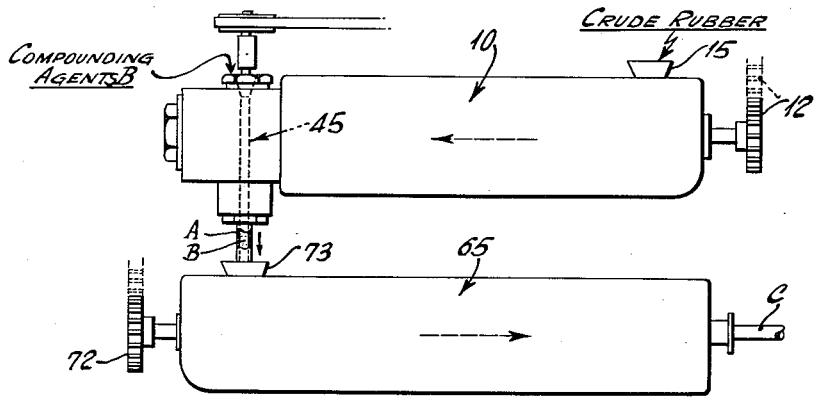
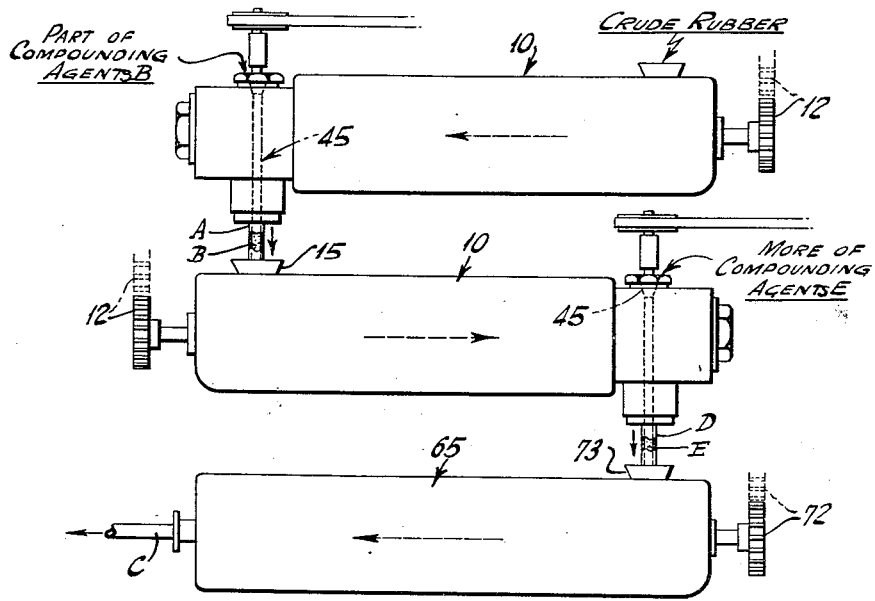

Patented Nov. 27, 1951

2,576,444

UNITED STATES PATENT OFFICE 2,576,444

ART OF TREATING PLASTIC MATERIALS SUCH AS RUBBER

James C. Clinefelter, Akron, Ohio

Application March 29, 1949, Serial No. 84,221

13 Claims. (Cl. 260—767)

1

The present invention relates to the art of preparing, processing, compounding and shaping such plastic materials as rubber stock (natural or synthetic).

One of the first operations carried out in the utilization of solid rubber stock such as crepe sheets, involves the physical plasticization of this stock by a kneading or breaking down process. This process consists mainly in subjecting the rubber to severe mechanical shearing stress to render the rubber softer and more readily deformable and to improve its adaptability for compounding, mixing and shaping.

Mills and internal mixers, such as the Banbury, are commonly used for physical plasticization and for other preparatory work on rubber stock. These apparatuses, and especially the internal mixers, are expensive and massive and are designed to operate intermittently on large batches, so that it has been difficult or impossible for the working elements to effect uniform intimate contact between all the particles throughout the mass. It is well known that each increase in batch size has resulted in a sacrifice of uniformity in the distribution of the chemicals, of the quality of the particle dispersion, and of the uniformity of physical plasticization. Also, the degree of uniformity in the gauge or size of the calendered or extruded compound varies as the degree of uniformity in the plasticity of the rubber content.

Moreover, these preparatory operations, through conventional mills and mixers, have been expensive as to power requirements due to the sizes of the batches operated upon at one time. Also, actions of the mills and mixers, and especially in the case of the internal mixers, have been so severe and violent as to require them to be rebuilt and repaired quite often. This violent action on a large batch also has the effect of generating such high temperatures as to make it necessary to omit curing agents, such as sulphur and/or accelerator from the batch, while the preliminary mixing operation is being carried out and to make it necessary to add these agents in subsequent mill-mixing operations.

One object of the present invention is to provide new and improved process and apparatus for preparing, compounding and shaping plastic materials, and particularly rubber stock.

Another object is to provide a new and improved process for physically plasticizing, compounding and mixing plastic materials, particularly rubber stock, which is easily and efficiently

2 adaptable for small plant operations, which can be carried out efficiently and continuously by the use of comparatively small inexpensive units requiring substantially less time cycle than is required by the use of conventional mills and mixers, which is adapted to prepare comparatively small quantities of the rubber substance at any one period, thereby producing intimately mixed, uniformly dispersed compositions of uniform physical characteristics throughout the mass, which can be easily carried out to permit the composition and physical characteristics of successive quantities of the product to be accurately duplicated in successive operations, and which does not produce high temperatures exceeding the curing temperature of the compounds involved, thereby permitting the use of curing agents in initial mixing operations.

A further object is to provide a new and improved apparatus for carrying out the improved physical plasticizing, compounding and/or mixing process above described.

Still another object is to provide a composite article in an intermediate stage of manufacture, comprising mechanically worked rubber and compounding agents, shaped, combined and related in a new and improved manner, to permit the comparatively inexpensive and expeditious manufacture of the article by comparatively small apparatus units, and to permit the easy handling of said article for subsequent preparation or for storage.

In carrying out certain features of the present invention, the raw or crude material to be processed, and particularly rubber, is extruded in predetermined form, and a measured quantity of compounding agent or agents is added therealong and retained therewith in undistributed form until ready to be mixed with and distributed throughout the rubber. More specifically, the solid rubber stock is advanced in an apparatus desirably in the general form of an extruder and is physically plasticized before extrusion to improve its adaptability for compounding, mixing and subsequent shaping. After receiving this preliminary plasticizing treatment and desirably before extrusion, a measured amount of compounding material, desirably including the curing agents, is continuously added to the rubber while in transit, so that the extruded rubber will have uniform amounts of the compounding material heterogeneously associated therewith per unit length of extruded rubber.

As a further feature, the incorporation of the measured amounts of compounding agents into the rubber in the first stage is effected by continuously extruding the rubber in this first stage as a tube and continuously feeding the compounding agents into the interior of said tube as a filling while said rubber is being extruded.

The resulting extruded rubber tube with the compounding agents incorporated therein can be stored until ready for further processing or may be subjected directly and continuously after the preliminary treatment described to a second treating stage, in which this extruded rubber tube as it is formed is directly fed into a second extruder or mixing unit for dispersing the compounding agents thoroughly throughout the mass of rubber and for further working said mass into a plasticized state. The rubber in this second stage will have the compounding agents thoroughly and uniformly dispersed therein and may be delivered in final die shape or passed through a calendar for sheeting or fabric impregnation purposes. If desired, or if found necessary, according to the size of the extruder or working units employed, the rubber mix of this second stage may be subjected to subsequent working and mixing stages before giving it final shape or treatment.

As another alternative, the compounding agents may be added in two stages. Thus, in the first extruder unit, part only of the compounding agents may be heterogeneously added continuously to the extruded rubber in measured equal quantities per unit length of extruded rubber. The resulting product may then be thoroughly mixed in a second similar extruder unit and as it is extruded therefrom, more or the rest of the compounding agents may be heterogeneously added continuously in measured equal quantities per unit length of the extruded rubber. The product formed in this second stage can be stored away or directly mixed in a third unit in preparation for final shaping.

Instead of depending on huge expensive machinery to prepare the rubber compound, and instead of preparing this compound intermittently in large batches, the process of the present invention may be made continuous and may be made to work on comparatively small quantities of rubber, allowing thereby intimate contact between and thorough intermixture of the particles in the small volume of the compound being prepared. The improved machinery results in economies in the processing of rubber and in speeding up production.

Various other objects features and advantages of the invention will be apparent from the following particular description and from an inspection of the accompanying drawings, in which:

Fig. 2 is a side elevation, partly in section, of a part of a mixing and extruding machine which can be employed to carry out a subsequent stage of the present invention; and Figs. 3, 4 and 5 are side elevations somewhat diagrammatically showing a number of apparatus units arranged for stage operation in accordance with processes constituting different embodiments of the present invention.

Figure 1:
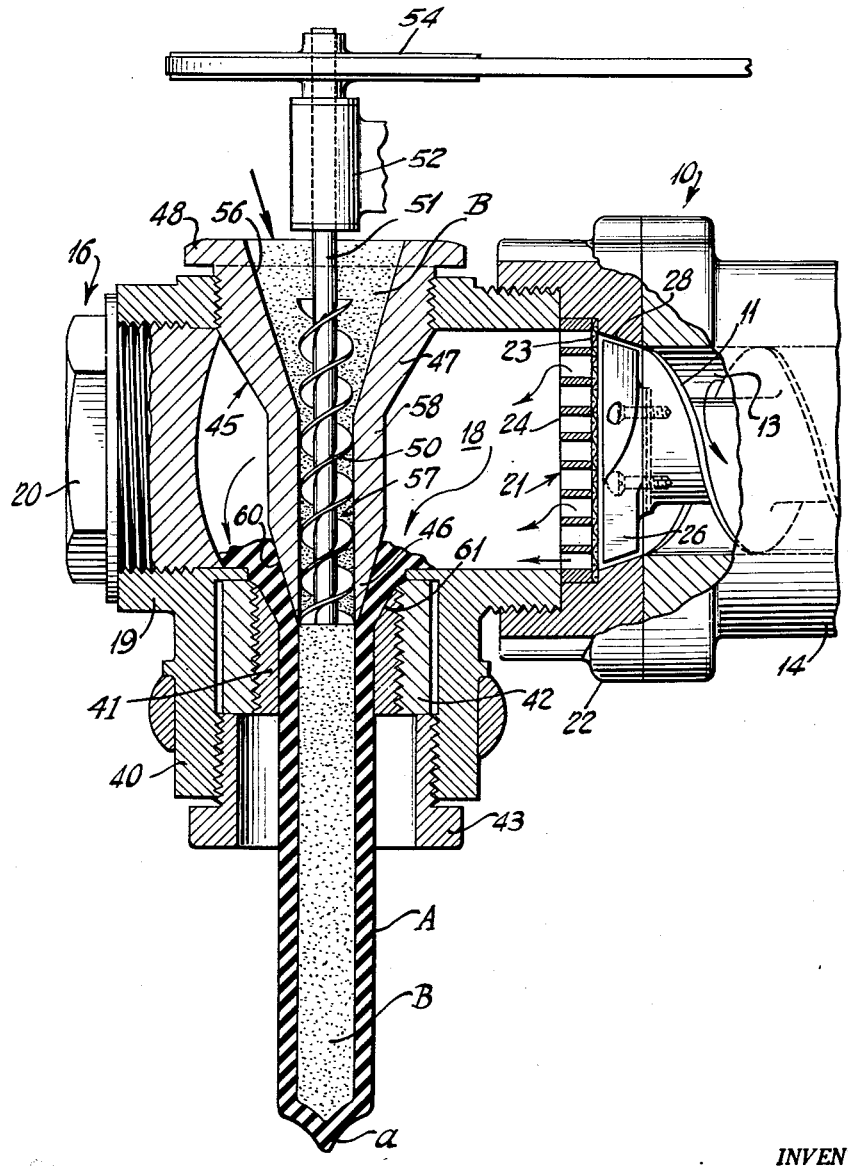
Fig. 1 is a side elevation, partly in section, of a part of a plasticizing, compounding and extruding machine which can be employed to carry out the preliminary stage of the present process and which embodies certain structural features of the present invention.

Referring to Fig. 1 of the drawings, there is provided a compounding machine 10 for carrying out the preliminary steps of preparing the plastic material and particularly the rubber stock (natural or synthetic) for final shaping. This machine comprises a feed screw 11 driven by a suitable drive 12 (Fig. 3) and operable in the bore or chamber 13 (Fig. 1) of a cylinder block or housing 14 to advance the rubber stock from a feed station 15 (Fig. 3) towards an extrusion head 16 (Fig. 1).

The extrusion head 16 defines a delivery chamber 18 into which the physically plasticized rubber is discharged before extrusion. The structure for forming this delivery chamber 18 may be of any suitable design, but for purposes of illustration, it is shown comprising a fitting 19 screwed to the cylinder housing 14 and closed at its outer end by a screw plug 20.

The physical plasticizing part of the extruder machine 10 is desirably of the improved type shown in my prior Patent No. 2,291,212. To that end, the two chambers 13 and 18 are separated by a perforated partition device 21 serving as a subdividing head by which the material is forced through openings in said partition device in stream or rod-like form and severed by the delivery end of the feed device, in the manner about to be described, to form a multitude of comparatively small bits which merge in the delivery chamber 18 into a conglomerate mass.

The perforated partition device 21 is clamped between the fitting 19 and the delivery end 22 of the cylinder housing 14 and comprises a circular screen 23, desirably of wire woven construction, and a flat circular perforated backing plate 24.

As more fully shown and described in the aforesaid Patent No. 2,291,212, there is provided in that part of the chamber 13 between the perforated partition device 21 and the conveyor screw 11 an impeller or wiper blade 26 secured to the delivery end of said screw and arranged to rotate therewith. This impeller 26 is designed to push the material from the screw 11 through the partition device 21 and into the delivery chamber 18 with sufficient force to maintain the material in said delivery chamber under extrusion pressure. Moreover, this impeller 26, with its blade-like edges in close proximity to the rough or irregular surface of the screen 23, acts to shear off the material that has already passed through its perforations, thus severing it from the rest of the batch which continuously follows. As the impeller 26 continuously imparts a rotary movement to the mass in addition to a forward pushing movement, it will be seen, that after every severance at a given perforation, the material next pushed through the screen 23 will be from a different portion of the batch. Since such action occurs continuously, thorough mixing of the different parts of the rubber mass will result.

The action of the wiper blade 26 in conjunction with the perforated partition device 21 is to masticate and break down the rubber stock, so that it is physically plasticized and rendered more adaptable for compounding, mixing and shaping.

The chamber 13 is also desirably provided with an outward flare or expanding bore 28 near its delivery end and the impeller 26 is correspondingly shaped for the purpose indicated in the aforesaid patent.

The extrusion head fitting 19 is shown approximately in the form of a T having a lateral tubular outlet 40 into which is mounted an extrusion die 41 through which the rubber is forced in a continuous stream. This die 41 is in the form of a cylindrical ring retained in an embracing sleeve holder 42, as for example, by screw threads and having a cylindrical throat determining the outer cross-section of the tube extruded through said die. This die holder 42 in turn is supported in the extrusion outlet 40 and against a shoulder near one end of said outlet by a nut 43 threaded into the lower end of said outlet.

In order to reduce to a minimum pressure losses in the delivery chamber 18, this chamber instead of being in the angular shape shown may be designed to afford streamline direct flow from the outlet side of the partition device 21 to the die 41.

Before the mass of rubber is extruded through the die 41, the premixed compounding agents, desirably in subdivided solid form, are continuously associated therewith in measured quantities, so that predetermined uniform amounts of these agents are heterogeneously combined with the extruded rubber stream per unit length of this rubber stream. To that end, there is provided a hopper 45 shown in the form of a funnel extending substantially vertically through the delivery chamber 18, and having its discharge end 46 terminating adjacent the inlet end of the throat of the die 41 in position concentric therewith. This hopper 45 has its larger flaring vessel or mouth end 47 threaded into an opening in the fitting 19 and is provided at the top with a head 48 outside said fitting desirably hexagonal in shape to facilitate turning of the hopper for adjusting purposes to be described.

The compounding agents may be fed downwardly in the hopper 45 to its discharge end merely by gravity assisted by the vibration of the machine during operations or it may be positively advanced downwardly (or horizontally in the case of a horizontal feed tube) by means of a feed screw 50 extending into said hopper and having an upper shaft extension 51 by which said feed screw may be driven. This feed screw shaft extension 51 is shown journalled in a bearing 52 affixed to a bracket (not shown) which is secured to the frame of the machine and is driven through a rope drive comprising a rope pulley 54 at the upper end of said shaft extension.

The upper vessel section 47 of the hopper 45 has a conical bore 56 tapering downwardly towards a cylindrical bore 57 formed in a lower tube extension 58 of said hopper. The feed screw 50 fits in this bore 57 somewhat snugly but with a free rotative fit and has its lower end substantially coextensive with the lower end of the hopper tube 58.

To extrude the rubber stock from the delivery chamber 18 as a cylindrical tube, the lower discharge end 46 of the hopper tube 58 extends partly into the upper section of the die 41, concentrically therewith as previously described, to form a core for said die. The external surface 60 of the hopper tube 58 tapers downwardly towards the upper section 61 or mouth of the bore of said die, and this upper die bore section 61 is flared to define with said tapering tube surface 60 a contracting mouth for the die.

The compounding agents B are premixed before being discharged into the hopper 45 and may comprise such well-known ingredients as fillers and reinforcing agents, softeners, accelerators and sulphur.

With the arrangement as above described, the rubber is extruded through the die 41 and around the lower discharge end of the hopper tube 58 as a continuous tube A as shown, and, at the same time, the compounding agents B from the hopper 45 are fed continuously into said tube A as said tube is formed. At the beginning of extruding operations, the extruded end of the rubber tube is desirably pinched, as shown for example at a, to close said tube and to retain the compounding agents B therein. The filled tube A will then be discharged continuously from the machine and may be subjected to subsequent processing immediately thereafter as it is being produced or may be stored until required to be processed further.

The thickness or gauge of the tubular extrudate A may be controlled while the machine is operating by turning the adjusting head 48 on the hopper 45 to vary the axial position of the lower discharge end 46 of the hopper tube 58 with respect to the die 41.

If desired, and if found necessary, the machine 10 may be provided with suitable means for controlling the temperature of the rubber while it is being worked and moved forward in the working chamber 13, while it is flowing in the delivery chamber 18 and/or while it is being extruded through the die 41. For that purpose, suitable jackets (not shown) may be provided around said chambers 13 and 18 and/or die 41 for circulating a temperature controlling medium therethrough.

In following the process of the present invention, the bale of crude rubber stock, as for example, crepe sheets is reduced in size in order that the throat or inlet end 15 (Fig. 3) of the unit 10 may receive the particles or strips easily. These rubber stock particles or strips may be partially compounded, as for example, they may contain carbon black and oils added in previous operations on mills or internal mixers and the particles may be formed by machines such as pelletizers. In the case of synthetic rubbers, these may come in crumb form partially compounded and suitable for initial feeding operations. The unit 10 will physically plasticize and mix the rubber stock (natural or synthetic) and will produce the extruded rubber tube A containing the right proportions of chemicals throughout its length, as described. The rubber tubular extrudate A stuffed with the compounding agents B may be transferred to storage until required for subsequent preparation, as above stated, or it may be passed directly from the unit 10 into a second unit 65 (Fig. 2) for additional plasticizing, complete dispersion and final shape extrusion, as shown in Fig. 3. From this last unit, the thoroughly mixed mass may be extruded in final die shape, as for example, as a thin wall tube C, or may be discharged from said unit in condition for final treatment in some other device, as for example, a calendar where sheeting or impregnation may be effected or as a preparation for molded products.

This second unit 65 is desirably an extruder of the improved type shown in my aforesaid Patent No. 2,291,212 to assure thorough mixing and blending of the particles of the preparation or product A, B, and, as shown in Fig. 2, comprises in general a feed screw 70 in a chamber 71 operated from a suitable drive 72 (Fig. 3) and adapted to advance this preparation from a feed station 73 through a partition device 74, similar in all respects to the partition device 21 of Fig. 1. An impeller or wiper blade 75, connected to the delivery end of the feed screw 70 and located in an expanded bore 76, functions in the manner fully set forth in the aforesaid patent, namely, to force the material through the wire screen of the partition device 74 and shear off the material forced through the multitude of perforations thereof for physically plasticizing, thoroughly mixing and thoroughly dispersing. The conglomerated thoroughly mixed material on the discharge side of the partition device 74 is then discharged by the pressure created through a die 78 which will impart the desired shape to the material (in the present instance, see Fig. 3, the tube C).

If the rubber requires to be very heavily loaded with compounding agents, and there is not sufficient dispersion in the second unit 65, two units like unit 10 may be provided in series for the first and second operating stages and a third unit like unit 65 may be provided for the third operating stage, all as shown in Fig. 4. With this arrangement, a part of the compounding agents, as for example, one half, would be supplied to each of the units 10 to produce at the outlet of the second unit, an extruded tube of rubber D having part of the compounding agents E dispersed throughout the body thereof, and having the other part as a filling for said tube. The product D, E so constituted may be supplied to the third machine 65 for final processing, mixing and shaping.

As a further alternative shown in Fig. 5, where the rubber is to be heavily loaded with compounding agents in the initial stage, a first unit 10 is provided to form a thin walled extruded rubber tube A containing all of the compounding agents B in the hollow thereof. This product is delivered to a second unit 65 which will deliver the product in any desired form into the throat of a second, but final shaping, unit 65.

The product, as it is delivered from one unit to another in any of the staged combinations described, may be exposed for purposes of inspection.

While the invention has been described with particular reference to specific embodiments, it is to be understood that it is not to be limited thereto but is to be construed broadly and restricted solely by the scope of the appended claims.

What is claimed is:

1. A rubber treating process, comprising the steps of continuously kneading and breaking down rubber stock to physically plasticize it, simultaneously advancing said rubber stock towards and through an extrusion die to form a continuous tube of said rubber stock, continuously feeding a compounding agent or agents into said tube as it is extruded in sufficient amount to fill completely the tube, and mixing the resulting composite product to effect dispersion of said compounding agent or agents throughout the mass of rubber.

2. A rubber treating process, comprising the steps of continuously kneading and breaking down rubber stock to physically plasticize it, simultaneously advancing said rubber stock towards and through an extrusion die to form a continuous tube of said rubber stock, continuously feeding a compounding agent or agents into said tube as it is extruded in sufficient amount to fill completely the tube, and passing the resulting composite product through an extrusion unit to effect dispersion of said compounding agent or agents throughout the mass of rubber.

3. A rubber treating and shaping process, comprising the steps of continuously kneading and breaking down rubber stock to physically plasticize it, simultaneously advancing said rubber stock towards and through an extrusion die to form a continuous tube of said rubber stock, continuously feeding a compounding agent or agents into said tube as it is extruded in sufficient amount to fill completely the tube, then mixing, kneading and breaking down the resulting composite product to physically plasticize it and to effect dispersion of said compounding agent or agents throughout the mass of rubber, and simultaneously advancing the resulting plasticized mixture towards and through an extrusion die to form a finally shaped product.

4. A rubber treating process, comprising the steps of continuously kneading and breaking down rubber stock to physically plasticize it, simultaneously advancing said rubber stock towards and through an extrusion die to form a continuous tube of said rubber stock, continuously feeding into said tube some of the required compounding agent or agents as said tube is extruded in sufficient amount to fill completely the tube, mixing the resulting composite product to effect dispersion of said compounding agent or agents throughout the mass of rubber, extruding the resulting mixture as a continuous tube, and continuously feeding into said latter tube more of the compounding agent or agents as said latter tube is extruded in sufficient amount to fill completely the latter tube.

5. A machine for processing plastic material comprising, in combination, a working chamber, a delivery chamber, an extrusion die in the general form of a ring on the discharge side of said delivery chamber having a throat section determining the outer cross-section of the material extruded therefrom, a screw in said working chamber for advancing crude plastic material along said working chamber towards and through said delivery chamber, and a hopper in said delivery chamber having a tube at its discharge end extending into the inlet end of said throat substantially centrally therewith and forming a core for said extrusion die, whereby said plastic material is extruded through said die as a continuous tube, said hopper being adapted to deliver a compounding agent into said tube as it is extruded through said die.

6. A machine for processing plastic material according to claim 5, comprising a perforated partition device separating said working and delivery chambers, said screw being adapted to force said plastic material through said partition device and into said delivery chamber and carrying at its forward end an impeller in cutting relationship with said partition device.

7. In combination, a first machine for processing plastic material comprising an extrusion die, means for advancing crude plastic material from a feed station towards and through said extrusion die, means for masticating said crude plastic material while in transit towards said extrusion die, and means for continuously adding a compounding agent to the plastic material after said material has been masticated and before it is extruded, and a second machine for mixing the resulting composite product to effect dispersion of said compounding agent throughout the mass of plastic material.

8. The combination according to claim 7, wherein said second machine comprises a working chamber having an inlet near one end for receiving said composite product and a discharge near its other end, a feed screw in said chamber for advancing the composite product from said inlet towards said discharge, and means for mixing the plastic material and the compounding agent and further masticating the plastic material while in transit between said inlet and said discharge.

9. In combination, a first extrusion machine for processing plastic material comprising means for extruding plastic material as a continuous tube, and means for continuously feeding into said tube as it is extruded a compounding agent, and a second extrusion machine for mixing the resulting composite product to effect dispersion of said compounding agent throughout the mass of plastic material and for extruding the mixed product.

10. The combination according to claim 9, wherein said second extrusion machine comprises a working chamber having an inlet near one end for receiving said composite product and a discharge near its other end, a final shaping die at said discharge end, a feed screw in said working chamber for advancing the composite product from said inlet towards said die, and means for mixing the plastic material and the compounding agent while in transit between said inlet and said discharge.

11. The combination according to claim 9, wherein said second extrusion machine comprises means for extruding the mixture as a continuous tube, and means for feeding a compounding agent into said tube as it is extruded.

12. The combination according to claim 9, wherein said second extrusion machine comprises an extrusion die, a feed screw for advancing the composite product towards said extrusion die, a perforated member in the flow path of said product beyond the delivery end of the feed screw, and an impeller connected to the delivery end of said feed screw and defining one or more blade edges in cutting relation to said perforated member to cut off at intervals the product passing through the perforations in said member.

13. The combination according to claim 12, wherein said feed screw is operable in a cylindrical chamber having its delivery end adjacent said perforated member flaring towards said member, said impeller being of similar general flaring outline.

JAMES C. CLINEFELTER.

REFERENCES CITED

The following references are of record in the file of this patent:

UNITED STATES PATENTS

| Number | Name | Date |
| --- | --- | --- |
| 876,755 | Webb | Jan. 14, 1908 |
| 1,260,321 | Bulley | Mar. 26, 1918 |
| 1,607,626 | Hopkinson | Nov. 23, 1926 |
| 1,730,638 | Young | Oct. 8, 1929 |
| 1,849,291 | Gordon | Mar. 15, 1932 |
| 1,978,163 | Megow | Oct. 23, 1934 |
| 2,152,311 | Jacobson | Mar. 28, 1939 |
| 2,291,212 | Clinefelter | July 28, 1942 |
| 2,319,859 | Hale | May 25, 1943 |
| 2,422,480 | Gordon | June 17, 1947 |